US006199879B1

United States Patent
Cino et al.

(10) Patent No.: US 6,199,879 B1
(45) Date of Patent: *Mar. 13, 2001

(54) DOLLY AND BOX FOR USE WITH THE DOLLY

(76) Inventors: Nadine Cino; Martin Spindel, both of 501 Seventh Ave., 18th Floor, New York, NY (US) 10018

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,736
(22) PCT Filed: Jan. 11, 1996
(86) PCT No.: PCT/US96/00421
§ 371 Date: Aug. 24, 1998
§ 102(e) Date: Aug. 24, 1998
(87) PCT Pub. No.: WO96/21591
PCT Pub. Date: Jul. 18, 1996

(51) Int. Cl.[7] ....................................................... B62B 3/16
(52) U.S. Cl. .................... 280/33.998; 206/505; 206/509; 220/4.27; 280/79.2
(58) Field of Search ..................................... 206/503, 505, 206/509, 511, 512; 220/4.26, 4.27; 248/346.01, 346.5; 280/79.2, 79.5, 33.998

(56) References Cited

U.S. PATENT DOCUMENTS

| D. 299,578 | * | 1/1989 | Wilson | D34/5 X |
|---|---|---|---|---|
| 1,912,847 | * | 6/1933 | Klepel | 280/33.998 X |
| 5,060,819 | * | 10/1991 | Apps | 206/503 X |
| 5,184,836 | * | 2/1993 | Andrews, Jr. et al. | 280/79.2 X |
| 5,375,741 | * | 12/1994 | Harris | 222/143 X |
| 5,542,635 | * | 8/1996 | Smith et al. | 280/47.35 X |

FOREIGN PATENT DOCUMENTS

| 310103 | 1/1952 | (DE) . |
|---|---|---|
| 2156407 | 7/1972 | (DE) . |
| 0 515023 | 11/1992 | (EP) . |

\* cited by examiner

*Primary Examiner*—Michael Mar
(74) *Attorney, Agent, or Firm*—Anderson, Kill & Olick P.C.

(57) ABSTRACT

A box and dolly system for moving, storing or retrieving goods wherein the box comprises a plurality of substantially upright walls with at least one of the walls having at least two surfaces disposed in an offsetting relationship for forming an overhang and wherein the dolly comprises a plurality of upright walls and a housing adjacent the intersection of each pair of upright walls and with the housing extending from the walls of the dolly such that the dolly may be stacked directly upon another dolly of identical construction with both dollies aligned in the same orientation.

4 Claims, 11 Drawing Sheets

DOLLY AND BOX FOR USE WITH THE DOLLY

FIELD OF INVENTION

This invention relates to a box for use with a dolly and to a box and dolly system for moving, storing and retrieving file folders and various items and materials.

BACKGROUND—DESCRIPTION OF PRIOR ART

Historically, corrugated cardboard boxes have been used by businesses to hold file folders and other contents when relocating. During the past 5 to 10 years boxes made of plastic have been introduced as an alternative to using cardboard boxes in office moving. To date, boxes used in office moving, whether cardboard or plastic, have been commonly transported aboard dollies.

A dolly is typically comprised of a platform resting atop a set of wheels. The utility of this construction is broad. It not only lends itself to moving boxes that vary greatly in shape and size, but to transporting a large variety of other objects. In one respect, this broadness of utility creates a disadvantage, as it makes the dolly an attractive target of theft.

The box and dolly of the present invention were specifically designed to mate with each other and only each other. The dolly of the present invention does not have a platform and will not hold any object other than the box of the present invention. Accordingly, the dolly of the present invention is limited in its utility and is much less attractive as a target of theft than the typical platform dolly.

As such, the dolly of the present invention can be used in certain situations where the typical platform dolly would be subject to high levels of theft. One example of this occurs in office moving, where it would be desirable to have dollies on hand during the process of packing boxes. As that situation often necessitates leaving dollies unattended for long periods of time, the typical platform dolly is not a practical vehicle as it would likely be stolen in large quantities. The dolly of the present invention offers a better alternative as it is less likely to be stolen.

Since, as a practical matter, the dolly of the present invention can be on hand during packing, empty boxes can be placed aboard it and then packed. This allows the step in which boxes would otherwise have to be loaded onto dollies after they have been packed to be eliminated from the moving process, thereby saving time and money. The savings derives from the relatively low theft appeal of the dolly of the present invention, which is based upon its design as an item of limited utility.

When typical platform dollies are delivered to a location for use in moving they are usually cross-stacked (illustrated in FIG. 7C), meaning that any two adjacent dollies in a stack are in different orientations from each other. Such stacks are difficult to maneuver, lack stability and present a sloppy appearance.

The dolly of the present invention is designed to be parallel stacked (illustrated in FIGS. 7A and 7B), so that all dollies in a stack are in the same orientation. Such stacks are relatively easy to maneuver, stable and neat.

BRIEF DESCRIPTION OF THE DRAWINGS

Other advantages of the present invention will become apparent from the following detailed description of the invention when read in conjunction with the following drawings of which.

DESCRIPTION OF THE PREFERRED EMBODIMENT OF THE BOX

Figure 1A:
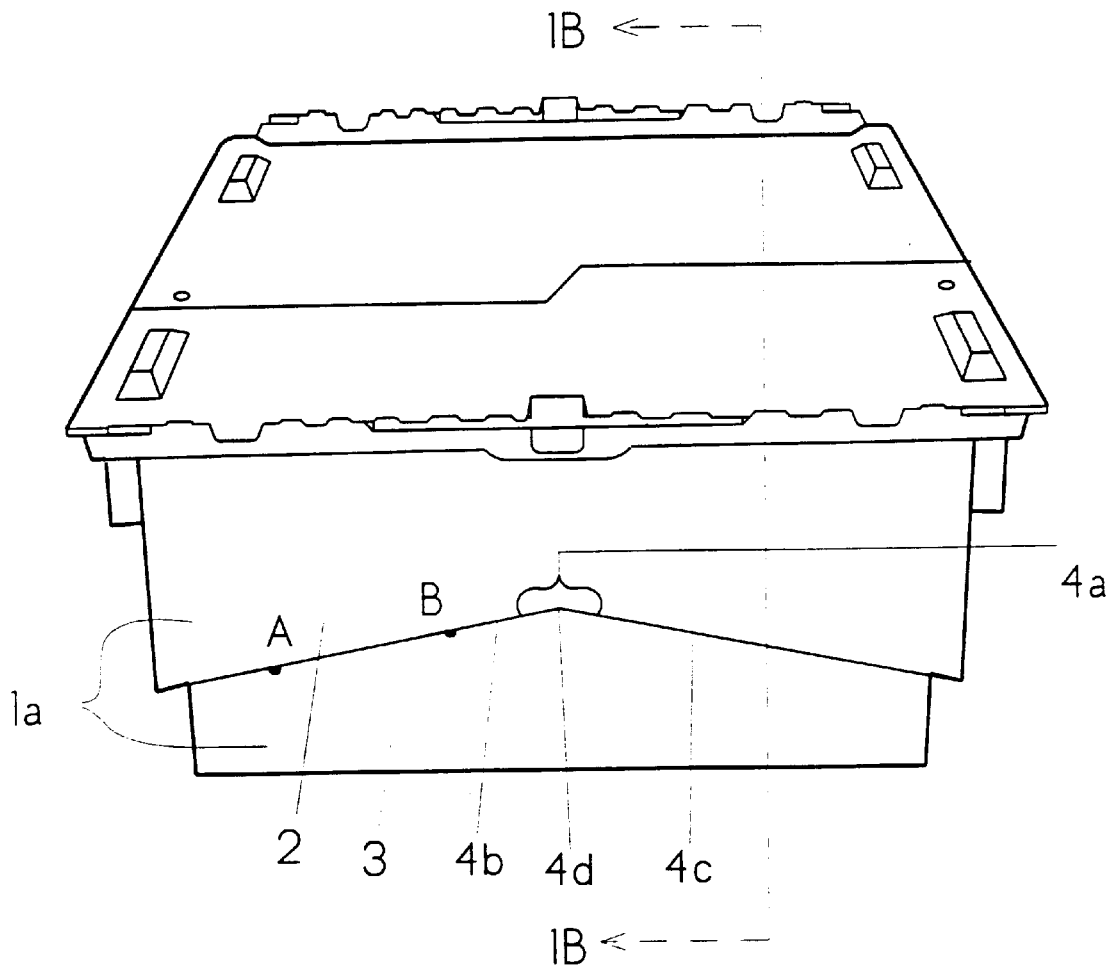
FIG. 1A is a perspective view of the preferred embodiment of the box of the present invention (lids closed), the composition of which includes side walls having an edge or overhang which is nonparallel to the bottom of the box and which function to support the box on (the preferred embodiment of) the dolly of the present invention.
Figure 1B:
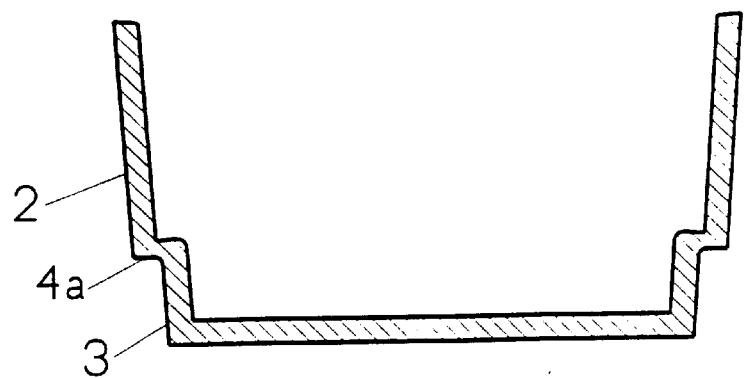
FIG. 1B is a cross sectional view taken along the lines 1B—1B of FIG. 1A.
Figure 2A:
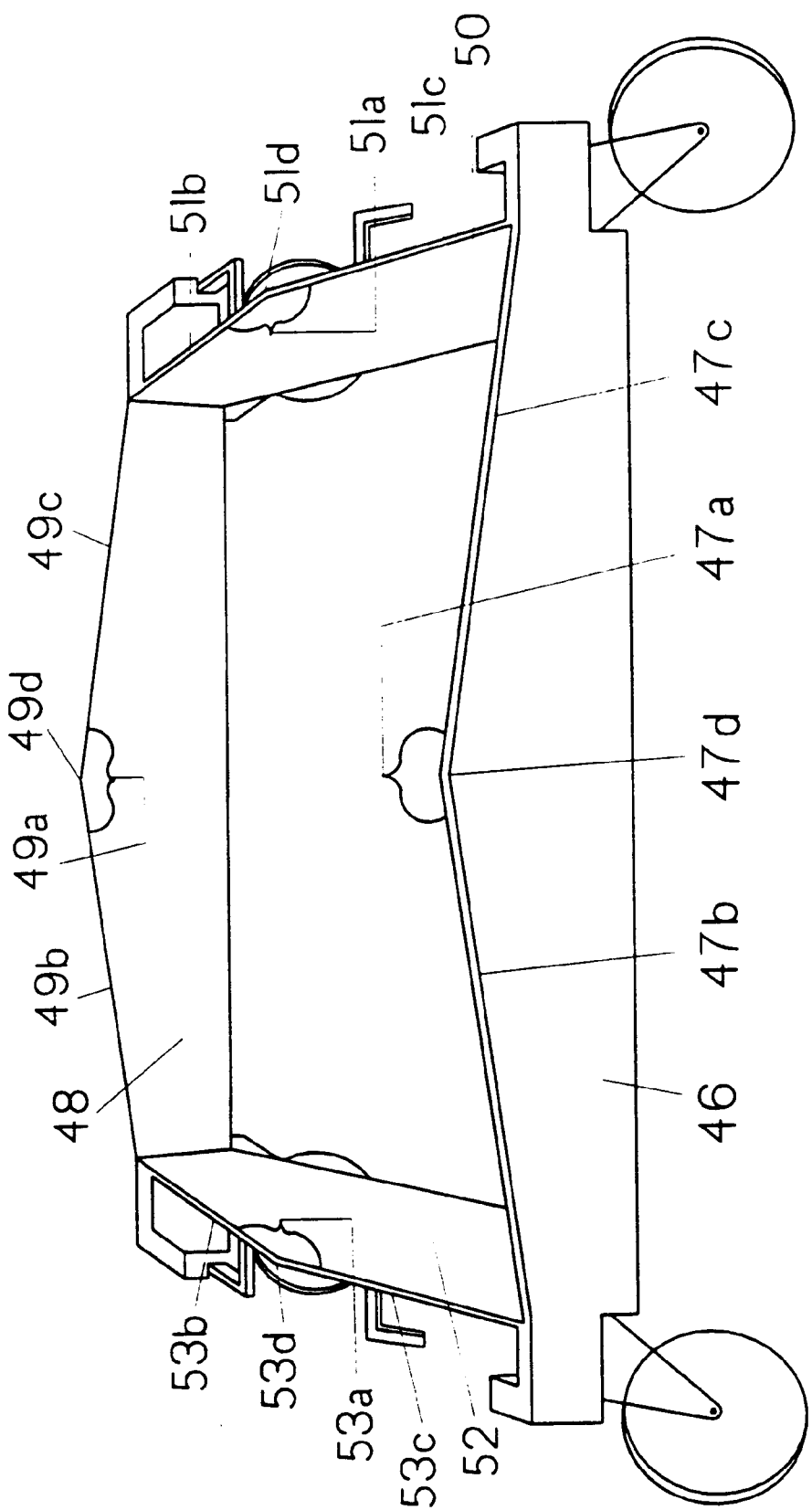
FIG. 2A is a perspective view of the preferred embodiment of the dolly of the present invention with side walls that support the box of FIG. 1A in accordance with the present invention.

FIG. 1A shows the preferred embodiment of the box of the present invention in perspective (top/front view). The box is substantially of rectangular geometry having four walls extending upright from a common floor or bottom wall. Side wall 1a is comprised of a vertical planar surface 2 and a vertical planar surface 3. The vertical surfaces 2 and 3 are offset from one another such that vertical surface 2 lies above and extends from vertical surface 3. The lower edge 4a of vertical planar surface 2 forms an overhang relative to vertical planar surface 3 which overhang is comprised of edge segments 4b and 4c, intersecting at apex 4d. The overhang formed by the edge 4a has a width (the dimension of which is shown in the cross sectional view of edge 4a illustrated in FIG. 1B) which is sufficient for the box to be supported by a complimentary edge 47a of a corresponding dolly wall as is illustrated in FIG. 2A. Preferably, at least two of the opposing four walls of the box have an overhanging edge each of which is supported by a corresponding complimentary edge of a dolly wall.

The segment 4b of edge 4a (FIG. 1A) begins at the left side of side wall 1a and rises at a gradual incline half way across the wall until it is joined at its right endpoint by edge segment 4c, which falls at a gradual decline until it reaches the right side of the wall. Segments 4b and 4c meet on the vertical axis of wall 1a at apex 4d. Side wall 1a and the wall opposite it, side wall 1b (not shown), comprise the two long walls of the box. The structure and dimensions of side wall 1b are identical to those of wall 1a.

Figure 4A:
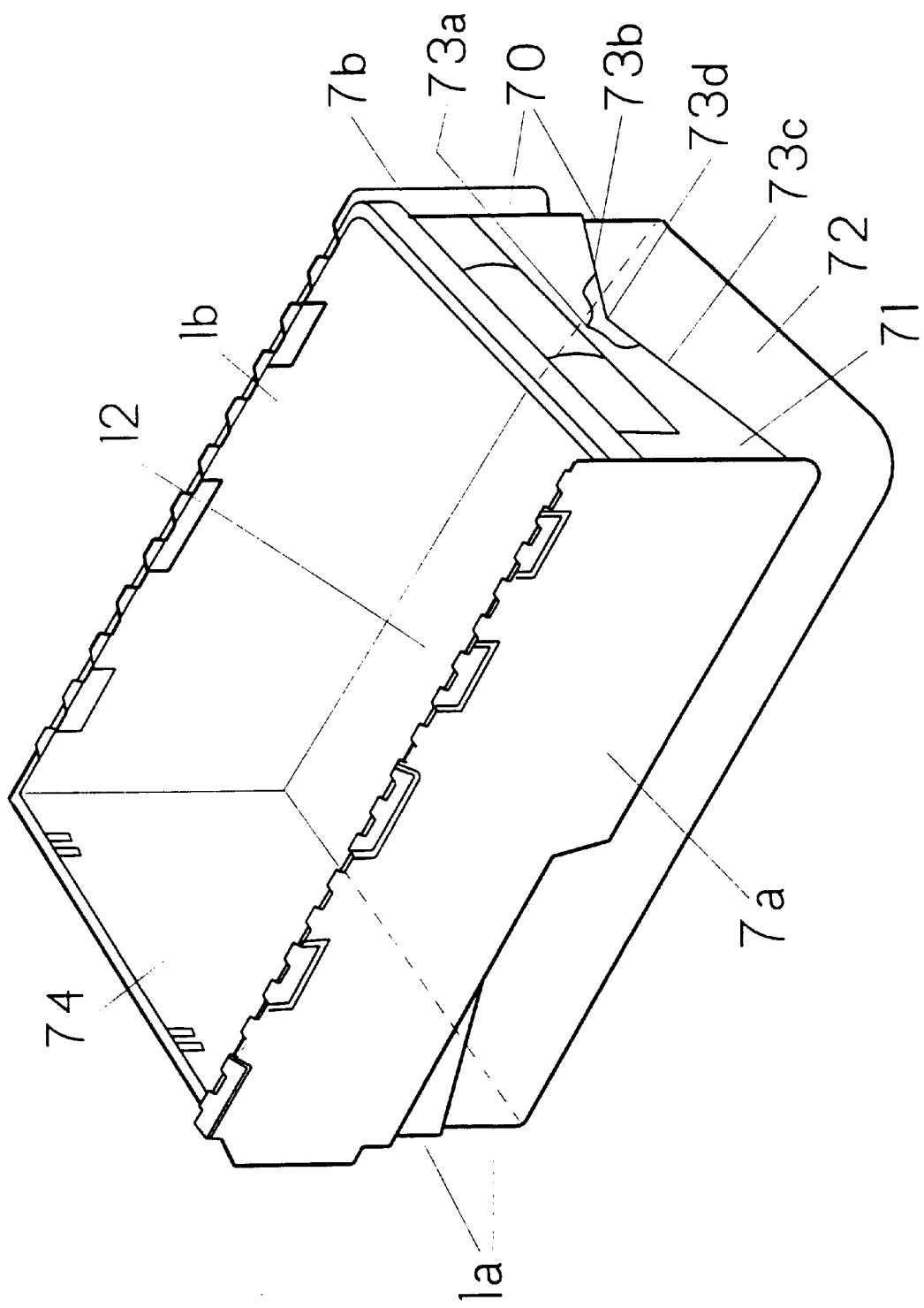
FIG. 4A is identical to FIG. 1A but oriented to show both the long and short side walls of the box and with the lids of the box shown open.

FIG. 4A shows side wall 70 of the box, which lies adjacent and orthogonal to side wall 1a. Like side wall 1a, side wall 70 is comprised of two vertical planar surfaces, i.e., planar surface 71 and planar surface 72. The planar surfaces 71 and 72 are offset from one another with surface 71 lying above and extending from surface 72. Edge 73a is the bottom end of planar surfaces 71 and is comprised of edge segments 73b and 73c. Edge segments 73b and 73c meet on the vertical axis of side wall 70 at apex 73d. The shape of edge 73a is identical to the shape of edge 4a of FIG. 1A, but the dimensions are different. Edge segments 4b and 4c of FIG. 1A are longer than edge segments 73b and 73c of FIG. 4A. Apex 4d of FIG. 1A is higher than apex 73d of FIG. 4A. The interior surface of side wall 74 lies opposite wall 70. The structure and dimensions of side wall 74 are identical to those of side wall 70. Side walls 70 and 74 comprise the two short walls of the box. The bottom or floor 12 of the box is shown in FIG. 4A. The edge segments 4b and 4c of FIG. 1A and the edge segments 73b and 73c of FIG. 4A are nonparallel to the floor 12 of the box.

Description of a Second Embodiment of the Box

Figure 1C:
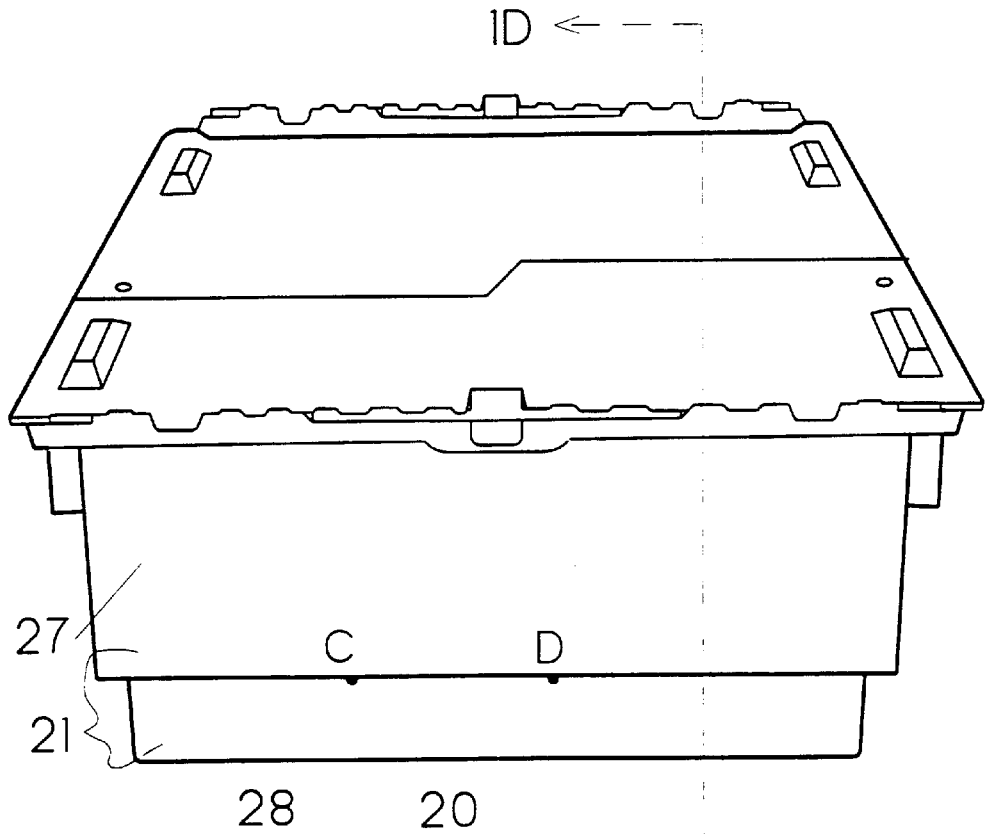
FIG. 1C is a perspective view of a second embodiment of the box of the present invention (lids closed), the composition of which includes side walls having an edge or overhang which is parallel to the bottom of the box and which functions to support the box on (a second embodiment of) the dolly of the present invention.
Figure 1D:
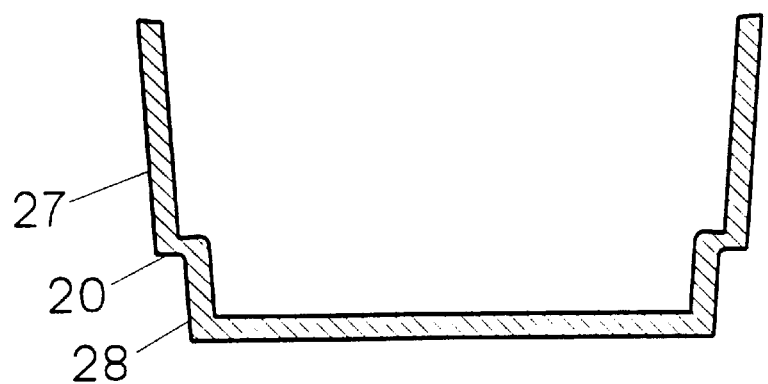
FIG. 1D is a cross sectional view taken along the lines 1D—1D of FIG. 1C.

A second embodiment of the box of the present invention is shown in FIG. 1C, which is of similar construction to the box of FIG. 1A except that the overhanging edge which spans the side wall has a configuration which is substantially different in geometry from that of edge 4a of FIG. 1A. Edge 20 begins at the left side of side wall 21 and extends horizontally in a straight line until it reaches the right side of the wall. Edge 20 is parallel to the floor 12 of the box. The side walls (not shown) extending transverse and adjacent to side wall 21 conform to the same concepts as those discussed above for side walls. FIG. 1D shows a cross section of the box taken along the lines 1D—1D of FIG. 1C. The cross sectional view shows the depth of the overhang formed by edge 20.

Preferred Embodiment of the Dolly

A preferred embodiment of the dolly of the present invention is illustrated in perspective in FIG. 2A (top/front view). The dolly is substantially rectangular in configuration and has four upstanding walls which are molded or joined together at their intersecting ends to form a single integral unit without any bottom support. Stated otherwise, the dolly of the present invention does not have a conventional horizontal platform. Side wall 46 is a vertical planar surface. Edge 47a represents the top of side wall 46 and is comprised of two edge segments, 47b and 47c. Edge segments 47b and 47c meet on the vertical axis of side wall 46 at apex 47d. Edge 47a, which is of the same shape and dimension as edge 4a of FIG. 1A, compatibly supports edge 4a. FIG. 2A also shows the interior surface of side wall 48, which is opposite side wall 46. The structure and dimensions of side wall 48 are identical to those of side wall 46. Side walls 48 and 46 comprise the two long walls of the dolly. The interior surface of side wall 50 of the dolly is a vertical planar surface disposed adjacent to side wall 46. Edge 51a is at the top of side wall 50 and is comprised of edge segments 51b and 51c. Edge segments 51b and 51c meet on the vertical axis of side wall 50 at apex 51d. Edge 51a, which is of the same shape and dimension as edge 73a of FIG. 4A, compatibly supports edge 73a.

Side wall 52 is shown in FIG. 2A opposite side wall 50. The structure and dimensions of side wall 52 are identical to those of side wall 50. Side walls 52 and 50 comprise the two short walls of the dolly. Apexes 47d and 49d (which are of equal height) are higher than apexes 51d and 53d (which are of equal height).

Description of a Second Embodiment of the Dolly

Figure 2B:
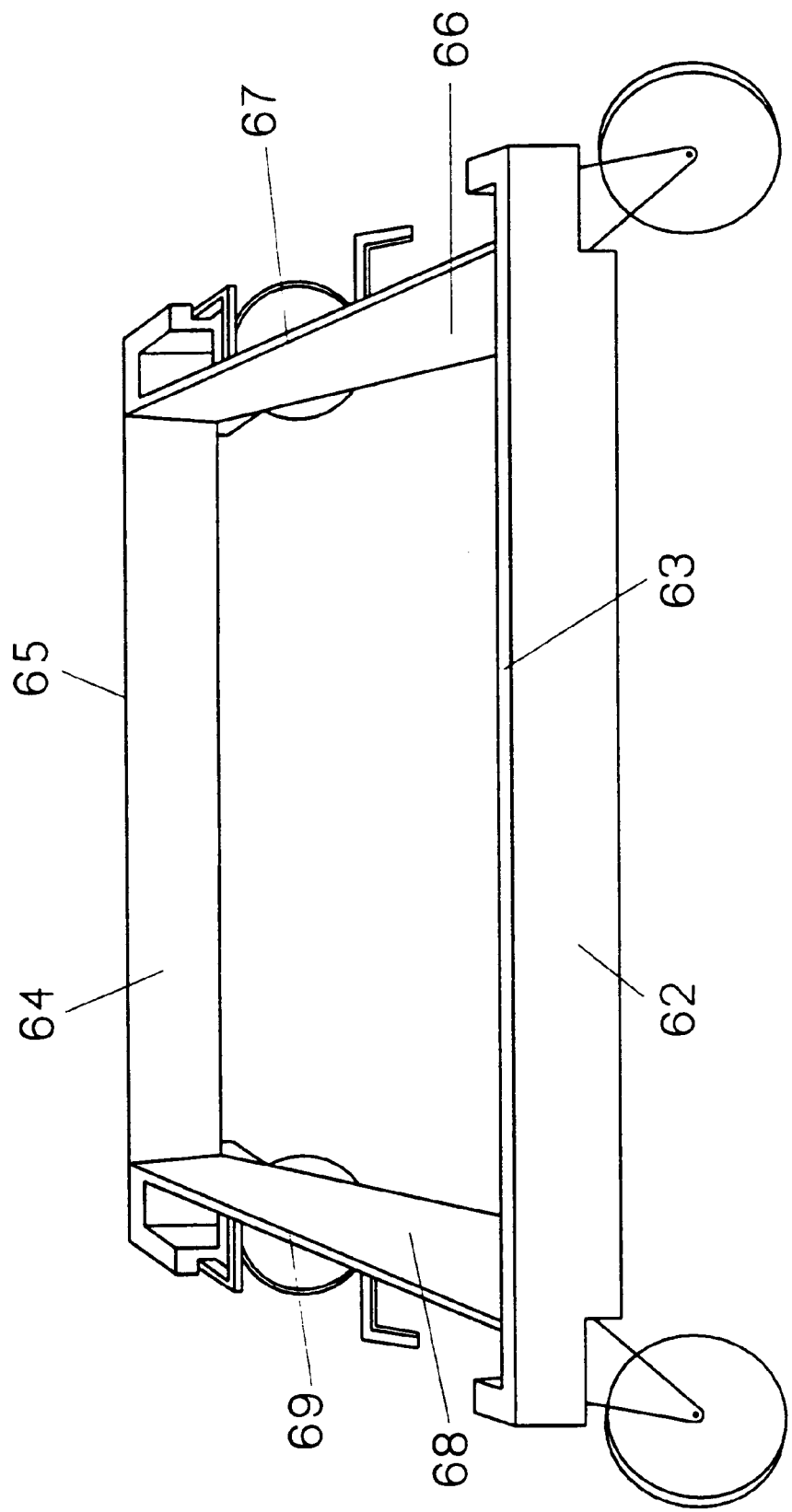
FIG. 2B is a perspective view of a second embodiment of the dolly of the present invention with side walls that support the box of FIG. 1C in accordance with the present invention.

A second embodiment of the dolly is illustrated in perspective in FIG. 2B (top/front view). In this embodiment the dolly is also rectangular in configuration with four upstanding walls without a floor or bottom support. Side wall 62 is a vertical planar surface. Edge 63 of side wall 62 has substantially the same shape as edge 20 of FIGS. 1C and 1D so as to support the box when mounted thereon. Side wall 64 lies opposite side wall 62. The structure and dimensions of side wall 64 are identical to those of side wall 62. Edge 65 of side wall 64 supports the overhanging edge (not shown) of the wall of the box opposite wall 21 of FIG. 1C. Side walls 64 and 62 comprise the two long walls of the dolly. Side wall 66 of the dolly lies adjacent to side wall 62 and is a vertical planar surface. The structure of side wall 66 is identical to that of side wall 62, but of shorter length. Edge 67 supports the overhanging edge (not shown) on the side wall of the box adjacent to side wall 21 of FIG. 1C. Side wall 68 of the dolly lies opposite side wall 66. The structure and dimensions of side wall 68 are identical to those of side wall 66. Side walls 68 and 66 comprise the two short walls of the dolly.

Dolly Stacking

Figure 7A:
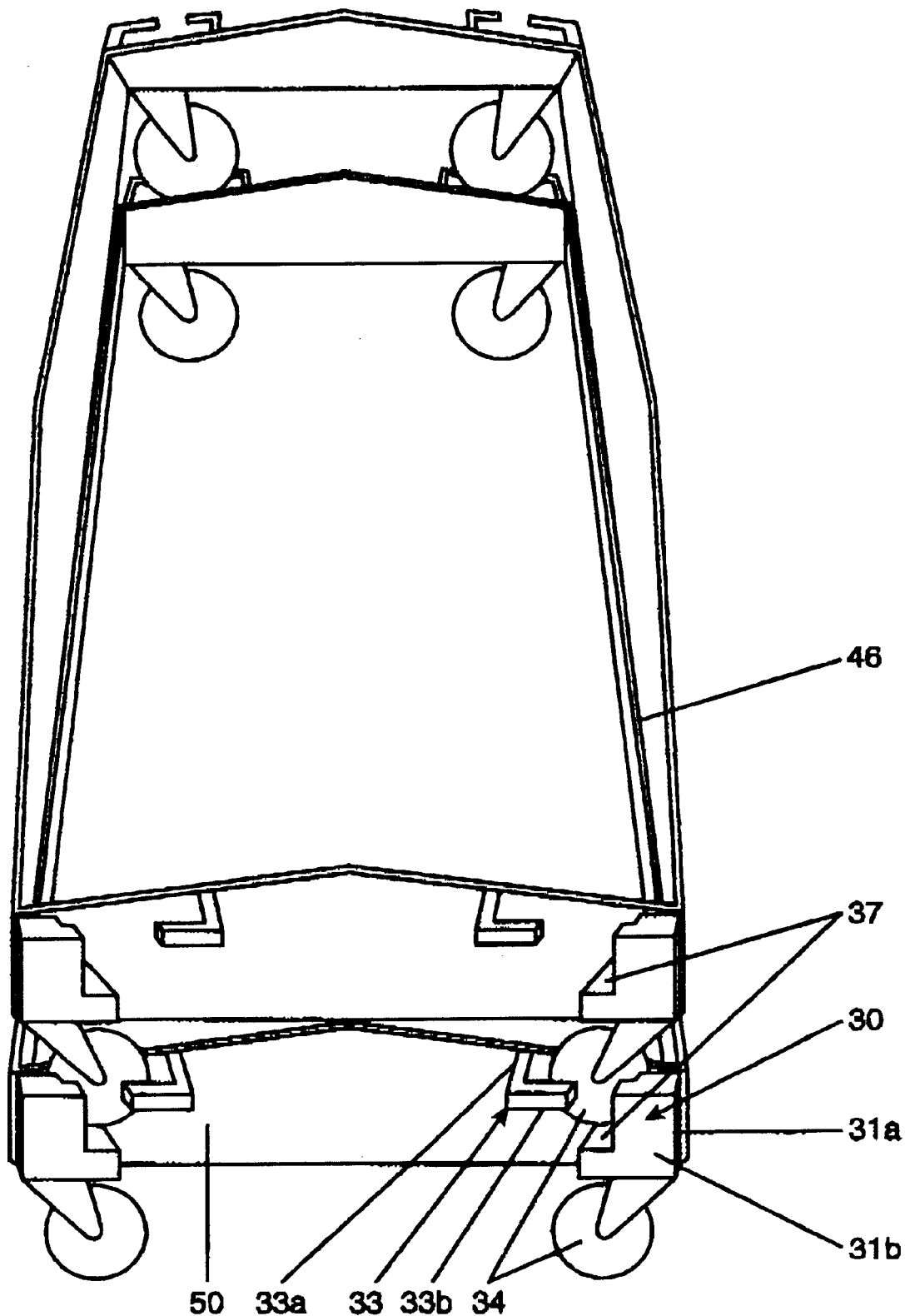
FIG. 7A shows a parallel stack of two dollies in accordance with the present invention.
Figure 7B:
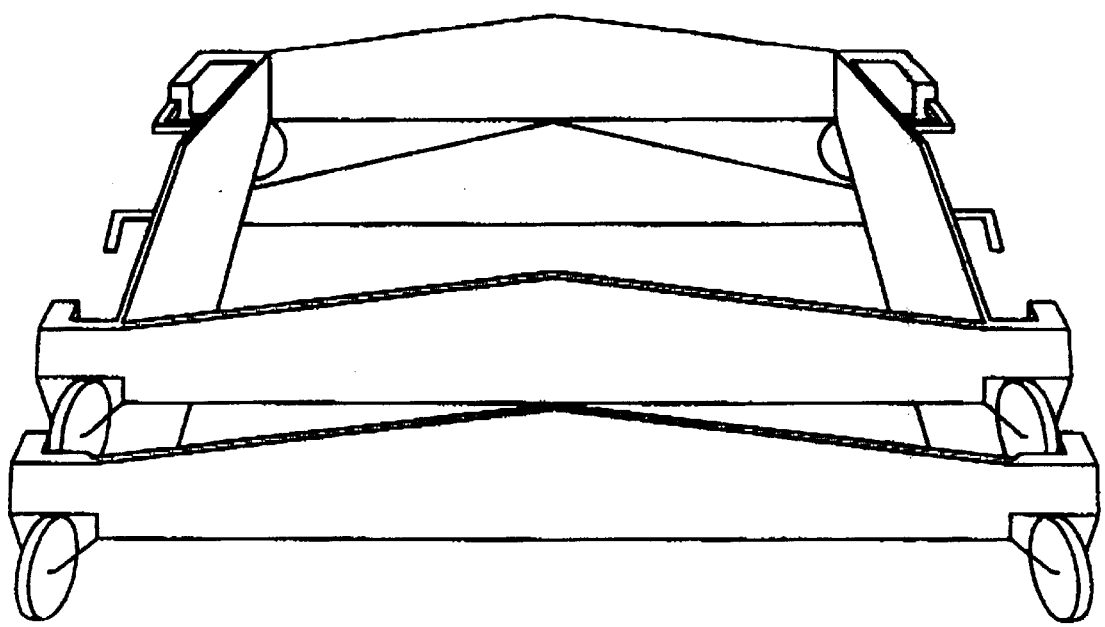
FIG. 7B is identical to FIG. 7A with a different orientation.
Figure 7C:
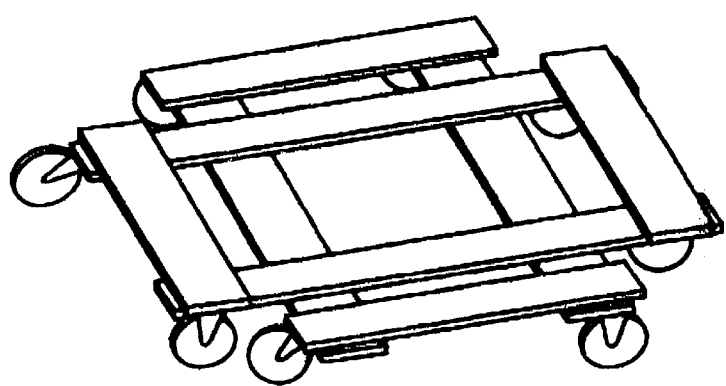
FIG. 7C shows a prior art cross stack of two conventional platform dollies.

FIGS. 7A and 7B illustrate how two dollies of the present invention are parallel stacked atop each other as compared to the cross stacking of two conventional dollies illustrated in FIG. 7C. Wheel rest platform 30 housing that is exterior to side walls 46 and 50. Surface 31a comprises the outer side of the wheel rest platform and surface 31b comprises the front side. The wheel rest platform is open in its center and at its top, and closed at its bottom. Floor 37 (numbered on both the upper and lower dollies for purposes of clarity) is the upper side of the surface that forms the bottom of the wheel rest platform. Wheel 34 (numbered on both the upper and lower dollies for purposes of clarity) is attached to the lower side of such surface. The dolly contains three other housings, all of which are identical to wheel rest platform 30.

Projection 33 is a wheel retainer comprised of elements 33a and 33b. Element 33a projects from vertical wall 50 of the dolly and is perpendicular or nearly perpendicular to it. Element 33b is attached at its end to the end of element 33a and is perpendicular or nearly perpendicular to it. The dolly contains three other wheel retainers, all of which are identical to projection 33.

As further illustrated in FIG. 7A, wheel 34 of the upper dolly sits inside wheel rest platform 30 of the lower dolly. Wheel 34 is oriented so that its broad side is more or less parallel to wall 50 of the lower dolly. The bottom of wheel 34 rests on floor 37 of wheel rest platform 30, i.e., floor 37 supports wheels 34. The interior side of surface 31a is an abutment that prevents wheel 34 from turning and the interior side of surface 31b is an abutment that prevents it from swiveling. Further security against turning is provided by wheel retainer element 33a and further security against swiveling is provided by wheel retainer element 33b. The interior sides of both of such elements act as abutments. The wheel rest platforms (e.g., wheel rest platform 30) and wheel retainers (e.g., wheel retainer 33) of the lower dolly, support and secure the wheels of the upper dolly, so that both dollies are positioned in the same orientation.

Operation

Figure 6A:
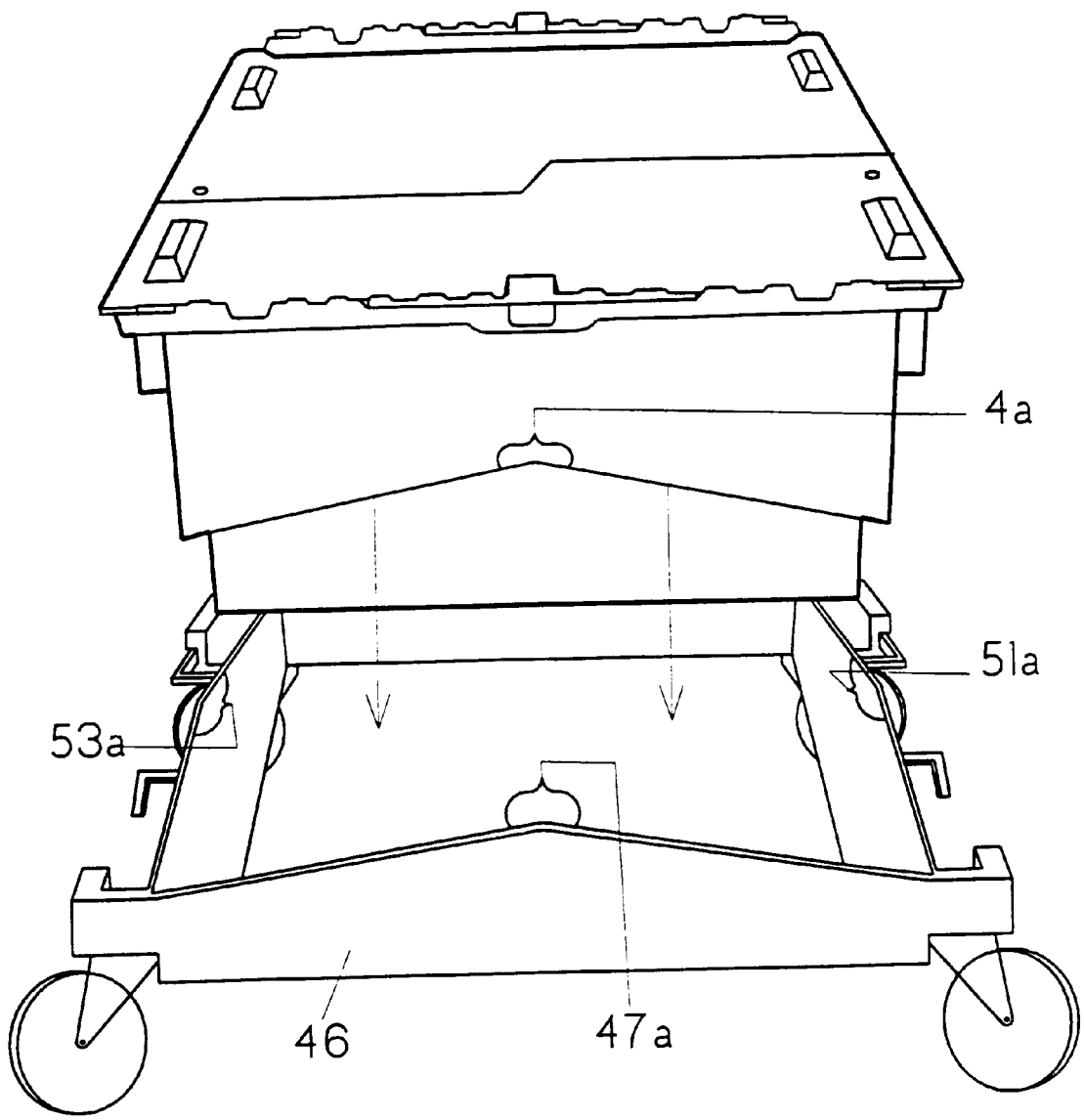
FIG. 6A shows in combination, the dolly of FIG. 2A and the box of FIG. 1A with the box descending into the dolly.
Figure 6B:
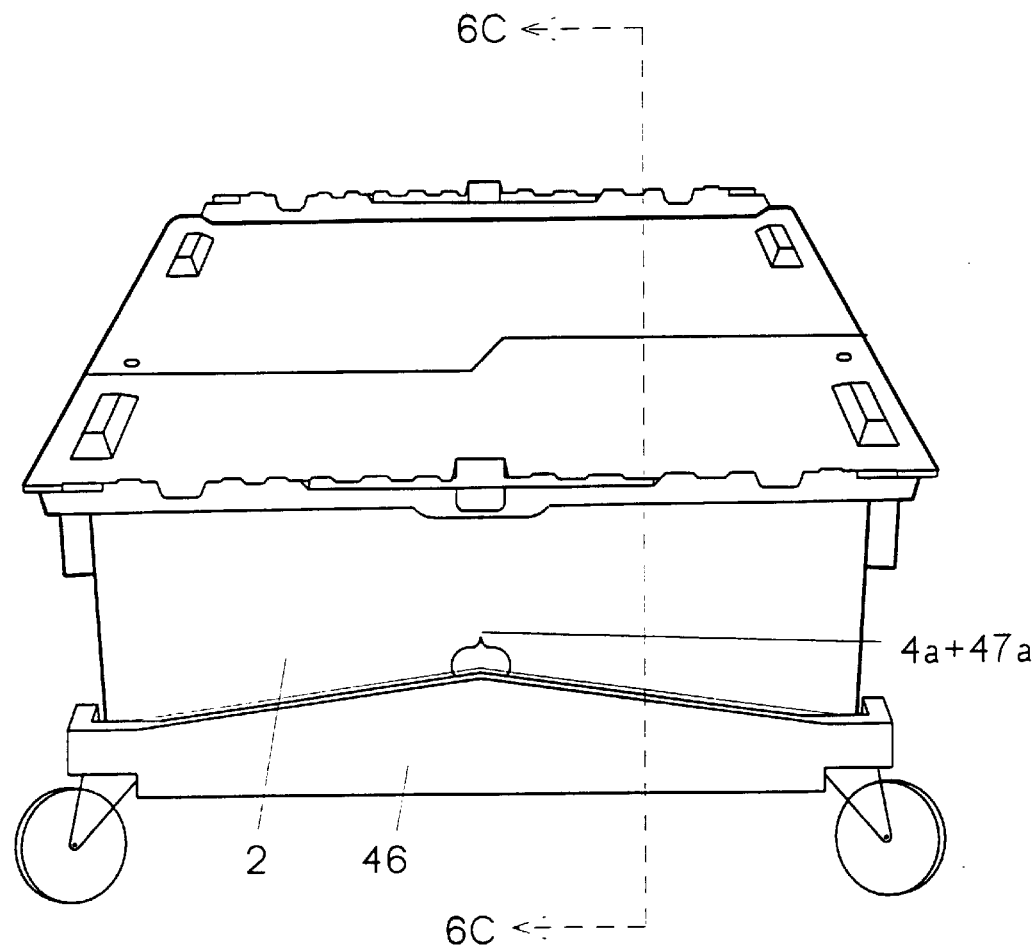
FIG. 6B shows the dolly of the present invention having 1 box stacked on it
Figure 6C:
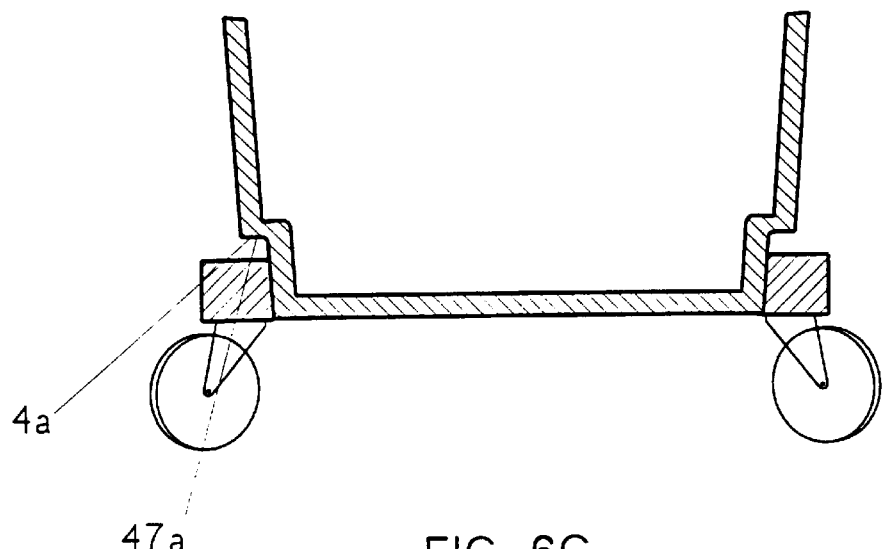
FIG. 6C is a cross sectional view taken along the lines 6C—6C of FIG. 6B.

An illustration of the manner of using the present invention for moving goods from one location to another begins with FIG. 6A, which shows the box and dolly in their preferred embodiments. The box is lowered into the dolly until edge 47a of the dolly meets edge 4a of the box and edge 51a of the dolly meets edge 73a (illustrated in FIG. 4A.) of the box. At this point, the edges on the other two side walls of the dolly will meet their compatible edges on the other two side walls of the box. As shown in FIGS. 6B and 6C, the edges of the dolly compatibly support the corresponding edges of the box. The edges of the box form an overhang, which is of sufficient depth for the box to rest firmly atop the dolly without falling through it. The cross sectional view in FIG. 6C shows the depth of the overhang formed by the edge 4a of the box as it rests on the corresponding edge 47a of the dolly.

As further shown in FIG. 6B, the interior side of side wall 46 of the dolly is flush against planar surface 3 (see FIG. 1A) of the box. As illustrated in FIGS. 6B and 6C, the weight of the box rests upon the dolly where edge 4a of the box meets edge 47a of the dolly. The dolly supports the box along the edges of its side walls. The side walls, and only the side walls, of the dolly support the box. Unique to the dolly of the present invention is that it does not have any horizontal platform upon which the bottom of the box can rest. Heretofore, dolly designs have relied upon horizontal platforms as the means of supporting the objects which rest upon them. The dolly of the present invention is, in effect, a bottomless dolly.

Lacking a bottom, the dolly of the present invention will not support any object other than one which is compatibly designed to fit the edges of its side walls, such as the box of the present invention. Since virtually all other boxes and objects are not compatibly designed, they would not be supported by the dolly. Instead, they would fall off of it. This greatly limits the dolly's utility rendering it unattractive as a target of theft. This enables the dolly of the present invention to be utilized in those aspects of moving where conventional dollies with horizontal platforms would likely be stolen in significant quantities.

If a board or other flat surface were laid across the tops of the walls of the dolly of the second embodiment (shown in FIG. 2B), the dolly could be adapted to move objects other than the box of the present invention, thereby increasing the broadness of utility of the dolly and its appeal as a target of theft. The dolly of the preferred embodiment (shown in FIG. 2A) is significantly more resistant to theft and/or adaptation than the dolly of the second embodiment (shown in FIG. 2B). Apexes 47d and 49d are higher than apexes 51d and 53d. A board or other flat surface which spanned the length and width of the dolly would come to rest upon apexes 47d and 49d, but not upon apexes 51d and 53d. For an object to be even minimally balanced, it must be supported by all four apexes. Since the spanning object would be supported by only two apexes, it would tilt and would likely fall off the dolly or, if it did not fall, would rest in a most awkward position. For this reason, the dolly of the preferred embodiment is less appealing as a target of theft than the dolly of the second embodiment.

Points "A" and "B" are imposed upon FIG. 1A to illustrate principles applied in the claims section of this application. Side wall 1a is comprised of surfaces 2 and 3, which are surfaces that "lie in more than one plane" (such words are used in the claims section). Points "A" and "B" lie on edge segment 4b, which is the bottom edge of surface 2 and which forms an overhang to support the box upon the dolly. Line AB is a straight line that is nonparallel to the bottom of the box. Accordingly, line AB is a straight line which is nonparallel to the bottom of the box and is defined by points lying on an overhang that supports the box upon the dolly. Edge segment 4b defines a locus of points lying on an edge which forms an overhanging supporting surface for the dolly to support the box.

Figure 5:
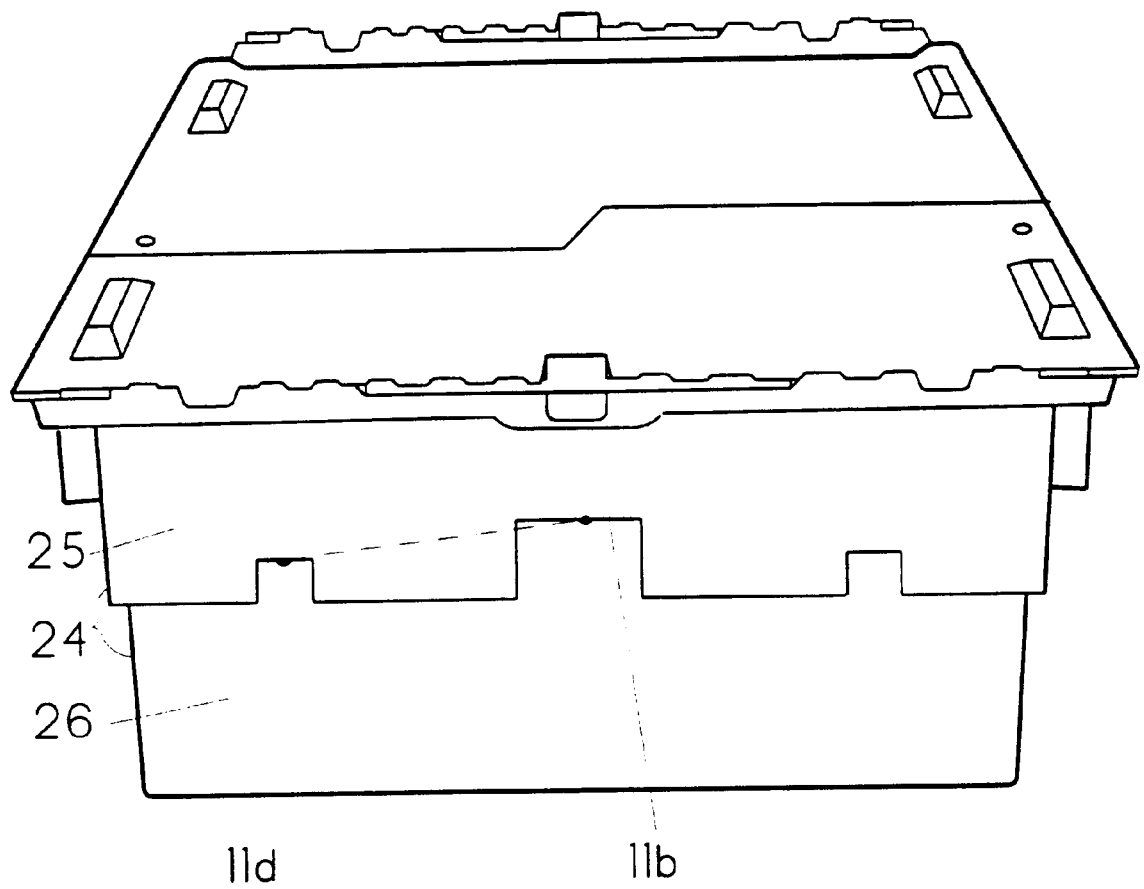
FIG. 5 is yet another variation of the box shown in FIG. 1A.

FIG. 5 illustrates the same concept as FIG. 1A, using an overhang of a sawtooth configuration which is of a substantially different geometry that of FIG. 1A or 1C. In FIG. 5, side wall 24 is comprised of surfaces 25 and 26, "which lie in more than one plane." Points "D" and "E" lie on edge 11, which is the bottom edge of surface 25 and which forms an overhang to support the box upon the dolly. Straight line DE is nonparallel to the bottom of the box. Accordingly, line DE is a straight line which is nonparallel to the bottom of the box and is defined by points lying on an overhang that supports the box upon the dolly. The bottom edge of surface 25 defines a locus of points lying on an edge which forms an overhanging supporting surface for the dolly to support the box.

Figure 3A:
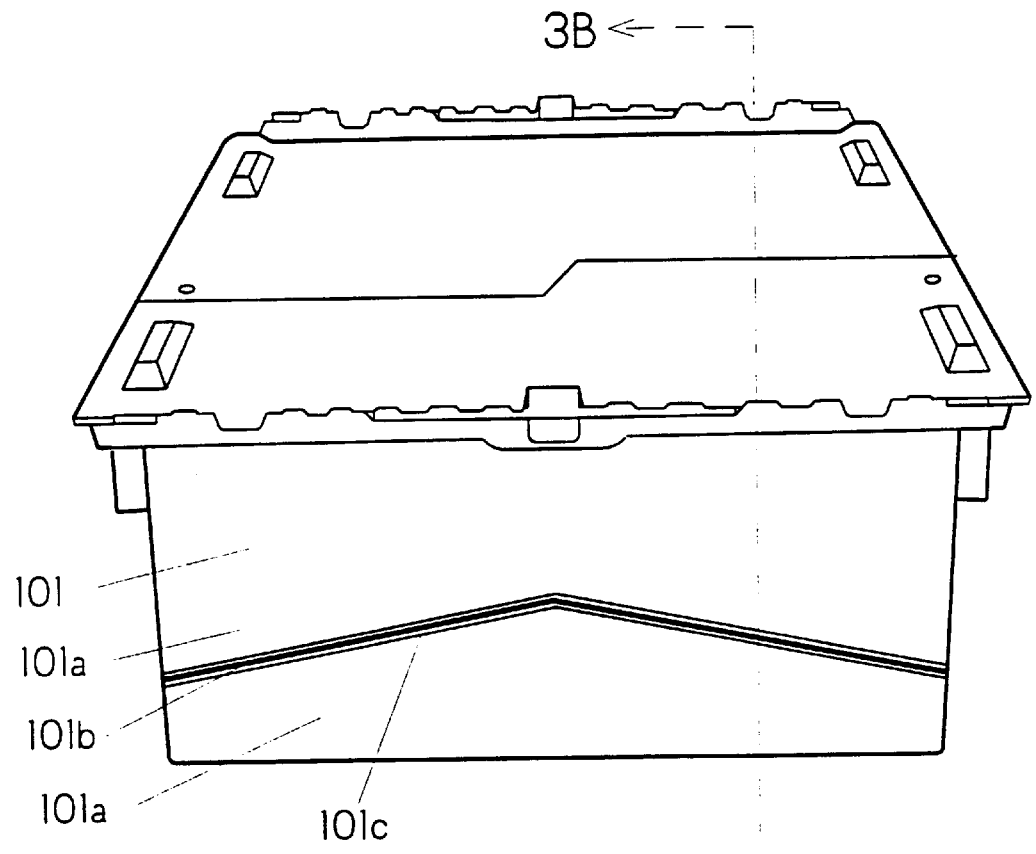
FIG. 3A is a view similar to FIG. 1A, but with a ledge (rather than an edge) forming the overhang that spans the wall shown.
Figure 3B:
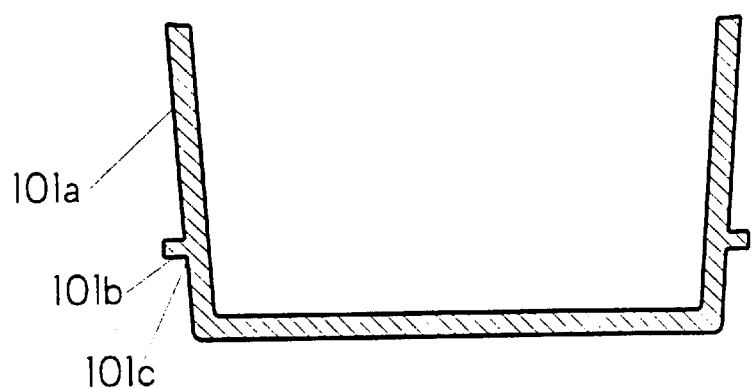
FIG. 3B shows a cross sectional view taken along the lines 3B—3B of FIG. 3A.

FIG. 3A illustrates the same concept as FIG. 1A, but with a ledge (rather than an edge) forming the overhang which rests upon the dolly. In FIG. 3A, wall 101 is comprised of surface 101a, which is flat and vertical, and surface 101b, which is oblong and horizontal. Surface 101b forms a ledge that spans surface 101a. The two surfaces (101a and 101b), which are in different planes, meet at juncture 101c and form an overhang. Accordingly, side wall 101 is "comprised of surfaces that lie in more than one plane and with at least two of such surfaces disposed in an offsetting relationship to one another for forming an overhang to support said box upon said dolly" (such words are used in the claims section of this application).

In summary, the box and dolly of the present invention relate integrally as a component system. The precise configuration of the edge or juncture along which they mate is irrelevant to the concept of the present invention. An infinite number of configurations are possible. Accordingly the invention should not be construed as limited to the embodiments shown and described realizing that the embodiments are but exemplifications of the invention with many other variations possible.

We claim:

1. A box and a wheeled dolly component system comprising: a box having a pair of opposed side walls, a pair of opposed end walls, a horizontal bottom wall, and a top opening for receiving articles to be transported, at least two of said walls having an upper planar wall portion and a lower planar wall portion, each upper planar wall portion extending outwardly beyond each lower planar wall portion and being interconnected to form an edge portion extending substantially along an entire length of each respective wall, each edge portion of at least one of said pairs of opposed side walls and end walls comprising at least one downwardly facing planar surface which is parallel to the bottom wall of the box, at least one of said upper planar wall portions comprising a plurality of recessed portions extending upwardly from said downwardly facing planar surface; and a wheeled dolly having support surfaces for supporting said box consisting of a pair of opposed vertically oriented side support walls and a pair of opposed vertically oriented end support walls which form an opening in said wheeled dolly extending through the entire wheeled dolly, said side and end support walls having upper edge portions extending substantially along their entire lengths with the edge portions of at least one pair of such side and end support walls having at least one complementary upwardly facing planar surface which mates with the corresponding downwardly facing planar surface on the wall of the box when the box is being supported by the dolly, at least one of said edge portions comprising a plurality of upwardly extending projections, one of said projections having a greater vertical height than the remaining plurality of projections for preventing a planar member from being supported in a horizontal orientation on the dolly, and wherein said dolly further includes a plurality of wheel housings each of which projects a sufficient distance outwardly from each of the opposed walls about the exterior of said dolly to provide clearance for the insertion of a wheel in each respective wheel housing such that said wheel housings permit a plurality of wheeled dollies to be stacked one upon another.

2. A box and a wheeled dolly component system as defined in claim 2 wherein each wheel housing comprises a horizontal platform that forms a bottom for said housing and at least one projection that, in conjunction with said horizontal platform, forms a pocket having a top opening which provides said clearance for insertion of a wheel from another dolly and which functions to confine the inserted wheel and limit its movement.

3. A box and a wheeled dolly component system as defined in claim 2 further comprising wherein said horizontal platform has a downwardly facing bottom side providing a surface for attaching a wheel to said dolly, said bottom side being substantially at the same level as the bottom surfaces of the vertically oriented side and end support walls of said dolly.

4. A box and a wheeled dolly component system as defined in claim 2 wherein said plurality of wheeled dollies when stacked one upon another all have the same orientation.

* * * * *